(12) United States Patent
Richard et al.

(10) Patent No.: US 11,169,095 B2
(45) Date of Patent: Nov. 9, 2021

(54) SURFACE INSPECTION SYSTEM AND METHOD USING MULTIPLE LIGHT SOURCES AND A CAMERA OFFSET THEREFROM

(71) Applicant: BOBST MEX SA, Mex (CH)

(72) Inventors: Matthieu Richard, Remoray (FR); Francis Pilloud, Clarens (CH)

(73) Assignee: BOBST MEX SA

( * ) Notice: Subject to any disclaimer, the term of this patent is extended or adjusted under 35 U.S.C. 154(b) by 148 days.

(21) Appl. No.: 16/301,024

(22) PCT Filed: May 29, 2017

(86) PCT No.: PCT/EP2017/025149
§ 371 (c)(1),
(2) Date: Nov. 13, 2018

(87) PCT Pub. No.: WO2017/207115
PCT Pub. Date: Dec. 7, 2017

(65) Prior Publication Data
US 2019/0178812 A1    Jun. 13, 2019

(30) Foreign Application Priority Data
May 30, 2016   (EP) .................................. 16172026

(51) Int. Cl.
*G01N 21/89*    (2006.01)
*G01N 21/88*    (2006.01)
(52) U.S. Cl.
CPC ..... *G01N 21/8901* (2013.01); *G01N 21/8806* (2013.01); *G01N 2021/8822* (2013.01); *G01N 2021/8905* (2013.01)

(58) Field of Classification Search
CPC ........... G01N 21/8901; G01N 21/8806; G01N 2021/8822; G01N 2021/8905
See application file for complete search history.

(56) References Cited

U.S. PATENT DOCUMENTS 5,087,822 A    2/1992  Fairlie et al. ................. 250/572
5,311,276 A *  5/1994  Masao ................. G01N 21/896
                                                    356/239.1

(Continued)

FOREIGN PATENT DOCUMENTS

EP    1 114 993 A2    7/2001
EP    2 508 870 A1    10/2012

OTHER PUBLICATIONS

International Search Report dated Aug. 21, 2017 in corresponding PCT International Application No. PCT/EP2017/025149.

(Continued)

*Primary Examiner* — Jennifer D Bennett
(74) *Attorney, Agent, or Firm* — Ostrolenk Faber LLP

(57) ABSTRACT

A surface inspection system for inspecting the surface of sheet elements present in an inspection area: The system includes two light sources arranged adjacent each other on opposite sides of an illumination plane, and a camera for capturing line images of the inspection area along a viewing plane. The illumination plane and the viewing plane are arranged on opposite sides of a median plane perpendicular to an inspection plane. The angle between the illumination plane and the median plane is the same as the angle between the viewing plane and the median plane. In a method of using the system, the first light source illuminates the sheet element before the second light sources does. An image evaluation unit compares the captured line images with each other.

17 Claims, 5 Drawing Sheets

(56) References Cited

U.S. PATENT DOCUMENTS

| | | | | |
|---|---|---|---|---|
| 5,367,378 | A | 11/1994 | Harding et al. | 356/371 |
| 6,166,393 | A | 12/2000 | Paul et al. | 250/559.08 |
| 6,327,374 | B1 * | 12/2001 | Piironen | G01B 11/303 |
| | | | | 382/108 |
| 2008/0245979 | A1 * | 10/2008 | Banton | G01N 21/57 |
| | | | | 250/559.4 |
| 2009/0109430 | A1 | 4/2009 | Stober | 356/237.2 |
| 2014/0368634 | A1 | 12/2014 | Pichon et al. | 348/86 |
| 2017/0126923 | A1 * | 5/2017 | Natori | H04N 1/0282 |
| 2017/0276476 | A1 * | 9/2017 | Konno | G01N 21/8901 |

OTHER PUBLICATIONS

Written Opinion dated Aug. 21, 2017 in corresponding PCT International Application No. PCT/EP2017/025149.

* cited by examiner

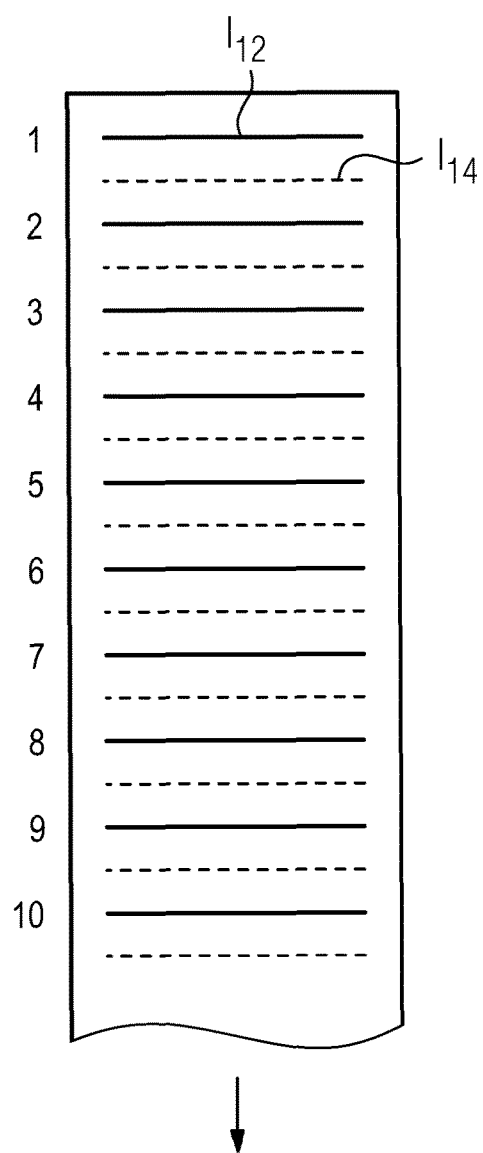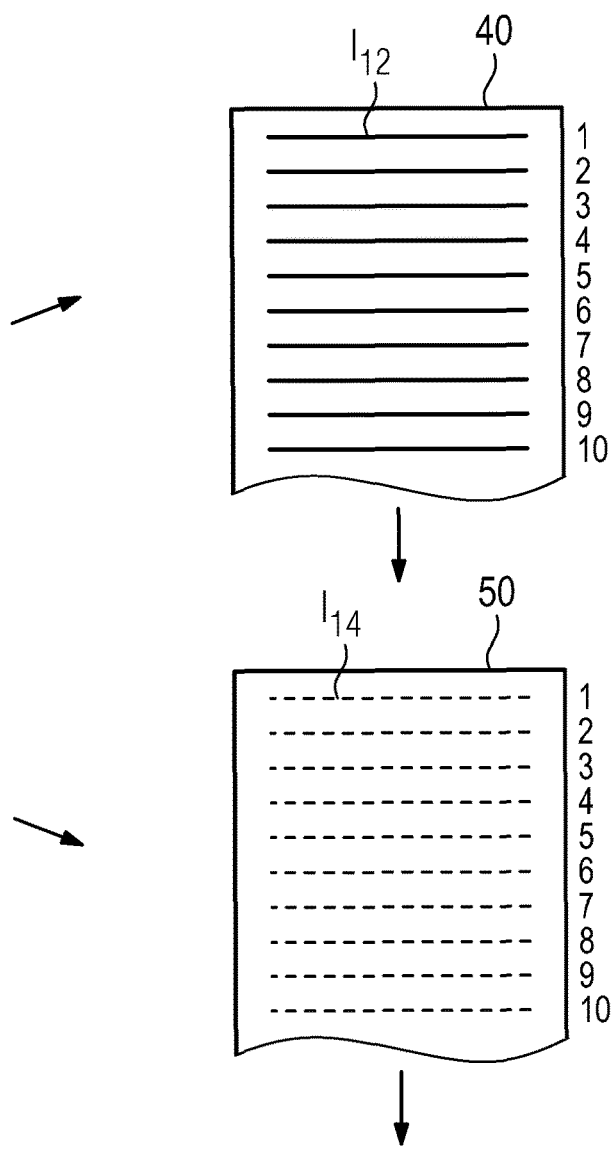
Fig. 8
Fig. 9

SURFACE INSPECTION SYSTEM AND METHOD USING MULTIPLE LIGHT SOURCES AND A CAMERA OFFSET THEREFROM

CROSS-REFERENCE TO RELATED APPLICATIONS

The present application is a 35 U.S.C. §§ 371 national phase conversion of PCT/EP2017/025149, filed May 29, 2017, which claims priority of European Patent Application No. 16172026.3, filed May 30, 2016, the contents of which are incorporated by reference herein. The PCT International Application was published in the English language.

TECHNICAL FIELD

The invention relates to a surface inspection system and to an inspection method for inspecting the surface of a sheet element. The invention can in particular be implemented in a quality control station in a sheet element processing machine.

TECHNICAL BACKGROUND

The term "sheet element processing machine" is here intended to comprise any machine which is being used for processing sheet elements such as paper, cardboard or similar materials, in particular printing machines, coating machines, laminating machines and converting machines, for example cutting, stamping, folding and/or gluing machines.

It is generally known to control the quality of sheet elements by means of a camera. Generally, the camera captures images of the sheet elements being transported through the quality control station, and the captured images are analyzed with respect to many different parameters so as to obtain information on whether or not the sheet elements fulfill certain criteria.

Certain types of defects of the surface of sheet elements are sometimes hard to detect. This is particularly true if defects such as scratches are to be detected on a highly reflective "glossy" surface of sheet elements which are being advanced at speeds of several meters per second through a quality inspection station.

SUMMARY OF THE INVENTION

The object of the invention is to reliably detect surface defects such as scratches on highly reflective surfaces of sheet elements.

In order to achieve this object, the invention provides a surface inspection system for inspecting the surface of sheet elements present in an inspection area. The system comprises an image evaluation unit, two light sources arranged adjacent each other on opposite sides of an illumination plane and oriented for illuminating the inspection area, and a camera adapted for capturing line images of the inspection area along a viewing plane. The illumination plane and the viewing plane are arranged on opposite sides of a median plane, which is perpendicular to an inspection plane. The angle between the illumination plane and the median plane is the same as the angle between the viewing plane and the median plane. Further, the invention provides a method of inspecting the surface of sheet elements by using the surface inspection system defined above, wherein a first of the two light sources directs light onto the sheet element to be inspected, and the camera captures a line image of the inspection area, and then the second of the two light sources directs light onto the sheet element to be inspected, and the camera captures a line image of the inspection area, wherein the image evaluation unit compares the captured line images with each other, in particular subtracts the line images from each other.

The basic idea of the invention is to compare two line images of the same surface area of the sheet element to be inspected, with the difference that the line images are the angle under which light used for illuminating the surface area is directed towards the surface. For the first line image, the light comes from a first of the light sources arranged on one side of the illumination plane, and for the second line image, the light comes from the second light source. For an easier understanding, the light sources are referred to in the following as "upper" light source and "lower" light source.

As the surface of the sheet element to be inspected is here assumed as being glossy, the reflection of the light coming from the two light sources is in theory specular if the surface is assumed to be a mirror and in practice close to specular. Thus, the reflected light originating from the upper light source passes the camera on its upper side, and the reflected light originating from the lower light source passes the camera on its lower side.

If the surface of the sheet element being inspected was a planar mirror, the camera would not detect any light as it would "see" into the space between the two light sources. Due to the close-to-specular reflection, there will in practice be some light which will be captured by the camera, namely scattered light. Furthermore, because the aperture of the camera is not zero, the camera will see for each pixel a circle surface on the light plane, due to the camera not being focused on the light sources but on the surface of the sheet element. In fact, the camera will capture a line image consisting of the lower margin of the reflected image of the upper light source, and a line image consisting of the upper margin of the reflected image of the lower light source. These line images which the camera will capture, are almost identical for a surface which is planar. If these line images are compared, e.g. by subtracting them from each other, there will be no difference, and for a subtraction, the result will be zero.

It is also possible for the light sources to overlap. In other words, there does not necessarily have to be a free space between the light sources, into which the camera can "see".

This situation regarding the captured line images however changes significantly when a surface defect such as a scratch is present on the surface of the inspected sheet element. The surface defect locally changes the orientation of "the mirror" so that the light coming from the upper and the lower light sources is no longer reflected symmetrically towards the camera but asymmetrically with respect to the camera, obviously only locally where the surface defect is present. As an example, it is assumed that the surface defect results in the surface being locally tilted such that the light coming from the upper light source is reflected directly into the camera. This necessarily results in the light coming from the lower camera being reflected further away from the camera than this was the case in a situation without a surface defect.

The two line images captured by the camera are accordingly different. Assuming that the reflection is specular, the camera "sees" the upper light source, at the point of the surface defect while it does not see the lower light source. If these line images are compared, a notable difference is present at the point of the surface defect.

It is possible to use a camera with a viewing area which covers the inspection area. For wider sheet elements, it is possible to use a plurality of cameras which are arranged adjacent each other, with the combined viewing area of the cameras covering the inspection area.

Suitable angles between the illumination plane and the median plane are in the range of 15° to 30° and preferably in the order of 20°.

The two light sources the "upper" and the "lower" light sources can be inclined with respect to the illumination plane by an angle in the range of 5° to 10° and preferably in the order of 7.5°

The camera can in particular be a line camera. This results in the image evaluation unit having to deal with a reduced amount of data, thereby allowing high processing speeds. As an alternative to a line camera, the camera can be a 2D camera.

In view of the camera being preferably a line camera, the term "line image" is being used here when referring to the images captured by the camera. If the camera however is an area camera, the line image captured by the camera does not consist of a single line only, but of a plurality of lines.

Depending on the evaluation which is to be made, the camera is a color camera if color information is of interest. In view of the amount of data to be processed, it however might be advantageous to use a grayscale monochrome camera.

For reliable detection of surface defects such as scratches, the camera advantageously has a resolution, at the surface of the sheet element to be inspected, in the range of 0.05 to 0.6 mm and preferably in the order of 0.1 mm.

In view of employing the surface inspection system and the method in sheet processing machines, the camera is adapted for capturing more than 10,000 line images per second and preferably more than 40,000 line images per second. Such rate is advantageous as it allows taking two line images of the same surface area to be inspected, namely one with the surface being illuminated by one of the light sources and a second one with the surface being illuminated by the second light source, without the sheet element having moved significantly between the two line images. Thus, the two line images can be considered as showing the same surface area of the sheet element.

When a high-performance camera is being used which is capable of capturing 40,000 line images per second or even more, it is possible to advance the sheet elements with a speed in the order of 1 to 5 m/s and even up to 15 m/s with respect to the surface inspection system.

A suitable transportation system for advancing the sheet elements through the viewing area of the camera is either a part of the surface inspection system, or the surface inspection system is associated with such transportation system.

While the invention can be employed to a certain extent for surfaces which result in a diffuse reflection, it has proven particularly advantageous when the inspected sheet elements at least partially have a reflective surface, for example a transparent glossy varnish on top of diffuse cardboard or carton.

It is possible that an image processing unit composes the different captured line images to a complete image. As an example, the image processing unit can reconstitute an entire bright-field illumination image and an entire dark-field illumination image from the interlaced line images. These reconstituted images can be used perform various subsequent quality check processes. For example, the extent of a scratch can be determined on a differential image. This information may be used to decide whether or not to reject the sheet.

The invention will now be described with reference to a preferred embodiment which is shown in the enclosed drawings. In the drawings,

BRIEF DESCRIPTION OF THE DRAWINGS

FIG. 8 schematically shows the different line images captured by the camera; and FIG. 9 schematically shows how reconstructed images are being generated based on the line images captured under different illumination conditions.

DESCRIPTION OF AN EMBODIMENT

Figure 1:
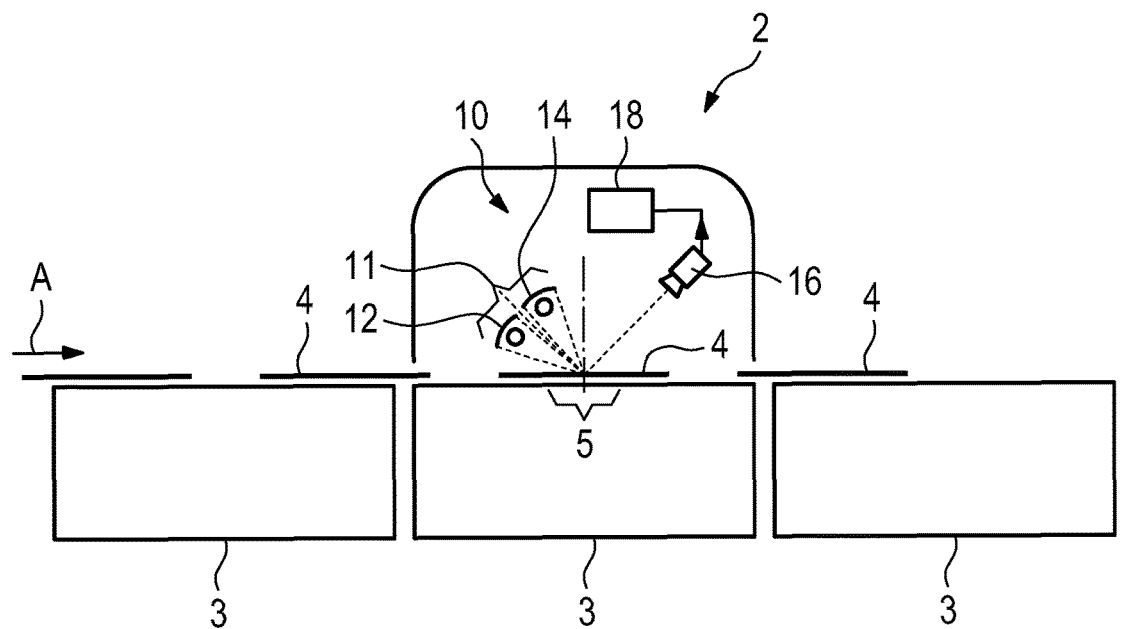
FIG. 1 schematically shows a side view of a surface inspection system according to the invention employed in a quality control station of a sheet element processing machine.

In FIG. 1, a quality control station 2 is schematically shown, which is employed in a sheet element processing machine of which conveyor tables 3 are shown. The sheet element processing machine can process sheet elements 4 which are being transported in the direction of arrow A. The sheet elements 4 can be sheets of paper, cardboard or a similar material, or they can be in the form of a longer web. The sheet element processing machine can be a printing machine, a stamping machine, a laminating machine, a folding machine, a gluing machine, etc.

The quality control station 2 is used for controlling the quality of the sheet elements 4. Generally, it comprises a surface inspection system 10. The surface inspection system 10 comprises an illumination system 11 with two light sources 12, 14 for directing light onto an inspection area 5 of a surface of a sheet element 4 which is currently being inspected, a camera 16 for capturing line images, and an image evaluation unit 18.

Figure 2:
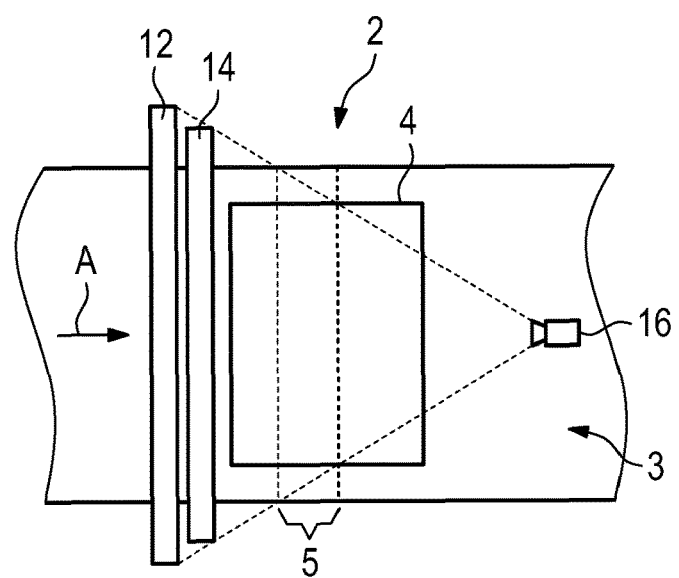
FIG. 2 schematically shows the surface inspection system of FIG. 1 in a top view.

The inspection area 5 is an elongate, narrow zone which extends over the entire width of the passage along which the sheet elements 4 are being transported, with the longitudinal axis of the inspection area 5 being preferably perpendicular to the direction A (see FIG. 2).

Figure 3:
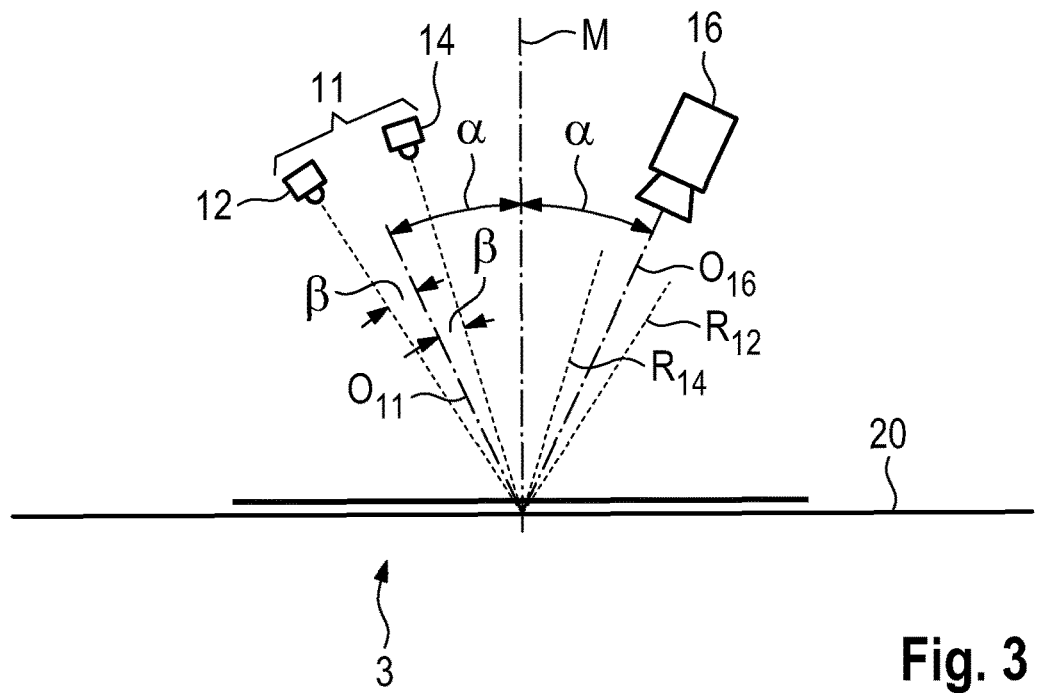
FIG. 3 schematically shows the surface inspection system of FIG. 1 in greater detail.

Details of the surface inspection system 10 are now being explained with reference to FIG. 3.

The upper surface 20 of the conveyor table 3 may be considered as being even or flat at least in the inspection area 5. Accordingly, the upper surface of a sheet element 4 inspected in inspection area 5 is also considered to be even or flat. A median plane M extends perpendicularly with respect to surface 20 and accordingly also perpendicularly with respect to the upper surface of the sheet element 4 within inspection area 5. In this example, the plane M is also perpendicular to direction A. It can have other orientation as well, which will be discussed later. In any case, median plane M must not be parallel to direction A.

Camera 16 is arranged such that its optical plane $O_{16}$ is inclined with respect to plane M by an angle α. In a preferred embodiment, the angle α here is in the order of 20°. Depending on constructional restraints and on the particular nature of the inspection to be carried out, other angles might be chosen as well.

Camera 16 preferably is a line camera which has a resolution of 0.05 to 0.3 mm on surface 20 such that elements in the order of 0.05 to 0.3 mm on the surface of the sheet elements 4 can be resolved. The sensor line of camera 16 is oriented parallel to the longitudinal axis of inspection area 5.

Illumination unit 11 has an optical plane $O_{11}$ which is inclined at the same angle α with respect to plane M, but is arranged on the opposite side of median plane M. Thus, the illumination unit 11 is arranged upstream of the inspection area 5 and of median plane M while camera 16 is arranged downstream of the inspection area 5 and of median plane M. It could however also be the other way around.

The longitudinal axes of light sources 12, 14 are arranged in parallel with the longitudinal axis of inspection area 5.

The two light sources are arranged symmetrically on opposite side of optical plane $O_{11}$. An angle β which designates the inclination of each of the optical planes of the light sources 12, 14 with respect to the optical plane $O_{11}$ of the illumination unit 11 is here in the order of 7.5°. The orientation of the optical planes of the light sources 12, 14 is such that the light generated by the light sources 12, 14 falls onto the surface of a sheet element 4 in the inspection area 5 and covers the entire width thereof in case a single illumination unit 11 is being used.

As an alternative to the arrangement of the light sources 12, 14 shown, it is also possible to arrange them immediately adjacent without any free space between them.

The light sources 12, 14 can be formed from a plurality of closely arranged LEDs. Lenses and other optic elements such as diffusers are used for generating a light beam in the form of a narrow band and is directed onto the surface of the sheet elements 4 in the inspection area 5. Further, the light is substantially uniform in the x direction of the viewing area 5 so that a uniform radiance both in the x direction and the y direction is achieved.

Light sources 12, 14 can share a common diffuser.

It is also possible to use two or more illumination units which are arranged adjacent each other in a transverse direction. In a similar manner, it is possible to use two or more cameras arranged adjacent each other in a transverse direction. Each of the illumination units or cameras then "covers" a part of the width of the inspection area 5.

As a result of the optical planes $O_{11}$ and $O_{16}$ being oriented in a mirror-symmetric manner with respect to the median plane M while the two light sources 12, 14 arranged angularly offset from the optical plane $O_{11}$, the camera "sees" the space between the two light sources, namely the space along the optical plane $O_{11}$ when it is being assumed that the surface of the sheet element is highly reflective "glossy" and planar. This assumption is correct for the preferred application of the subject surface inspection method and the subject surface inspection system.

Assuming now that the light sources generate light which falls onto the surface of a glossy sheet element 4 in the inspection area 5, it can be understood that the light of either light source is not detected by camera 16. The light originating from light source 12 is reflected along plane R12, and the light originating from light source 14 is reflected along plane R14.

Figure 4:
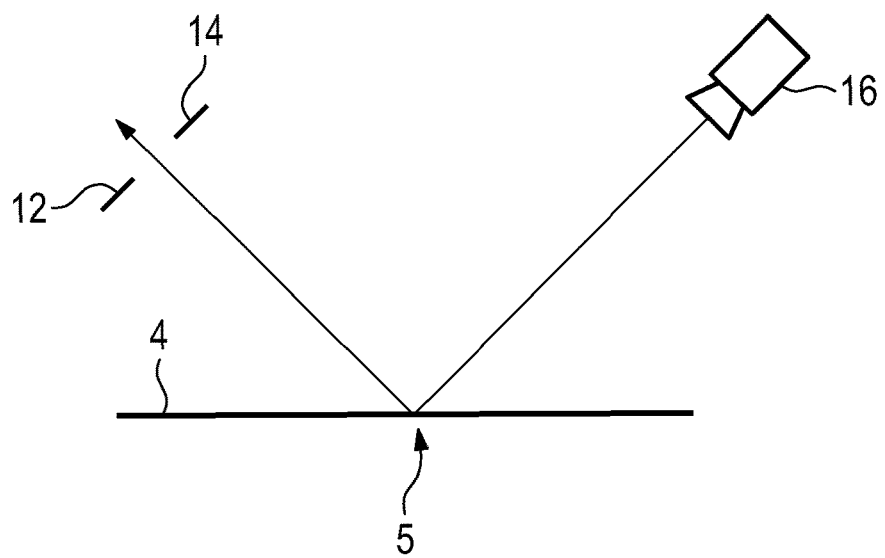
FIG. 4 schematically shows the illumination conditions during an inspection of a surface having no surface defect.
Figure 5:
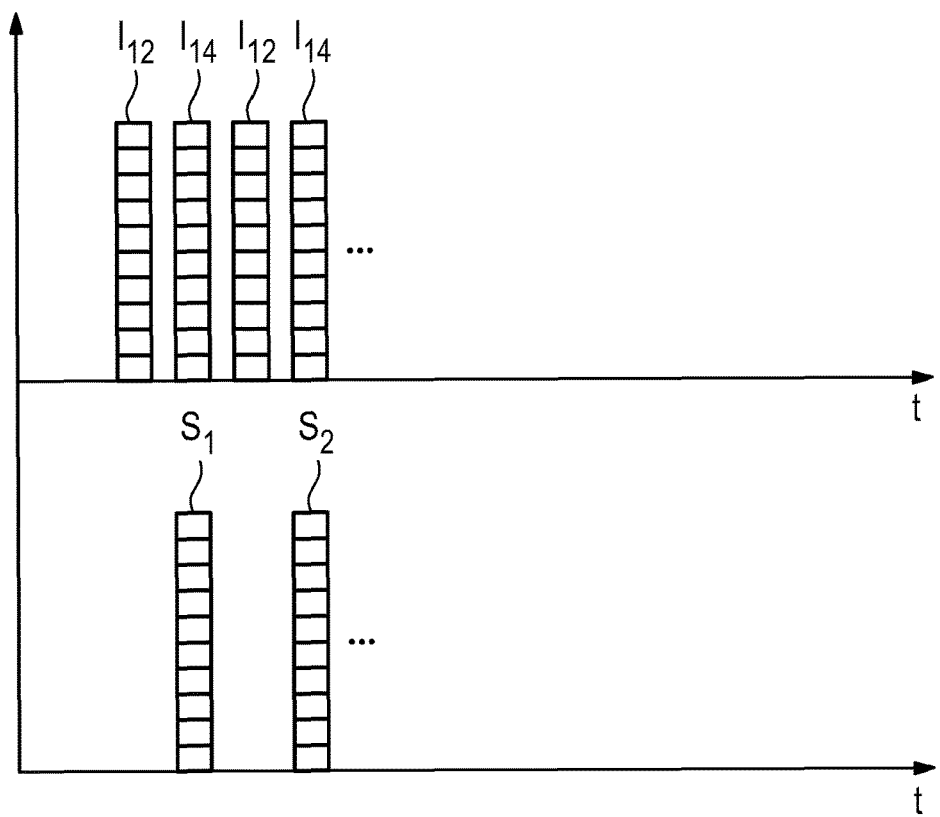
FIG. 5 schematically shows the line images captured by the camera of the surface inspection system under the conditions of FIG. 4, and the result of a comparison of the two line images.

With reference to FIGS. 4 and 5, the general mode of operation of the surface inspection system is being described.

The light sources 12, 14 are activated intermittently, and the camera 16 captures line images of one of two illumination conditions of the inspection area 5. Thus, the camera 16 captures a line image $I_{12}$ of the inspection area 5 being illuminated by light source 12 and then captures a line image $I_{14}$ of the inspection area 5 being illuminated by the light source 14. This is shown schematically in the upper half of FIG. 5. For better clarity, each line image captured by the camera 16 is shown here as having 10 pixels. In practice, each line image can consist of several thousands up to several tens of thousands pixels, depending on the resolution and the width of the inspection area 5.

As it is assumed for the example of FIG. 4 that the surface of the sheet element is glossy, planar and does not have any surface defect, the light is reflected as a specular reflection, and as the camera "sees" into the space between the two light sources 12, 14 (see FIG. 4), the intensity of the light captures at each pixel will be at least in theory zero. This is exemplified by the pixels shown in FIG. 5 being empty.

The image evaluation unit of the surface inspection system 10 compares the captured line images. In a preferred embodiment, the line images are subtracted from each other. In the lower half of FIG. 5, the result of the subtraction is shown as images S. The first column is the result of the first line image $I_{14}$ being subtracted from the first line image $I_{12}$, resulting in subtracted image $S_1$. The second column is the result of second line image $I_{14}$ being subtracted from second line image $I_{12}$, resulting in subtracted image $S_2$.

It can be seen that the value of each pixel of the result of the subtraction is also necessarily zero as the captured line images are identical.

The same result would be achieved if the subtraction was made the other way around, that is subtract the first captured line image from the later captured line image.

As the inspection principle is based on capturing two line images of the same points of the surface of the sheet elements 4, the line images $I_{12}$ and $I_{14}$ are being captured very quickly after each other. As the camera 16 captures the line images at a rate in the order of 10,000 lines per second or more, a particular portion of the surface of the sheet element has not moved noticeably in the time interval between successive line images being captured.

Depending on the particular information to be obtained from the surface inspection, the camera can be a color camera or a grayscale camera.

In the example shown, it is assumed that the surface of the inspected sheet 4 has reflection properties comparable to those of a mirror. In practice, the nature even of very glossy surfaces, that is surfaces covered with a foil or varnish, surfaces carrying a hologram will result at least to a certain amount in a close-to-specular reflection rather than a purely specular reflection. Nevertheless, the result of the comparison between a line image $I_{12}$ of the inspection area 5 captured while being illuminated by light source 12 and a line image $I_{14}$ of the inspection area 5 captured while being illuminated by light source 14 will be the same.

Assuming a close-to-specular reflection, there will in practice be some scattered light which will be captured by the camera. Getting back to FIG. 3, camera 16 will capture some reflected scattered light originating from light source 12 and some reflected scattered light originating from light source 14, namely some light being above line $R_{12}$ meaning: closer to optical plane $O_{16}$, and some light being below line $R_{14}$ again meaning: closer to optical plane $O_{16}$.

Under the assumption that the surface of sheet element 4 is planar, the two line images however will be identical; the camera will capture the same intensity of light for each pixel. Thus, the result of a subtraction of the line images is the same as shown in the lower half of FIG. 5, namely zero.

Figure 6:
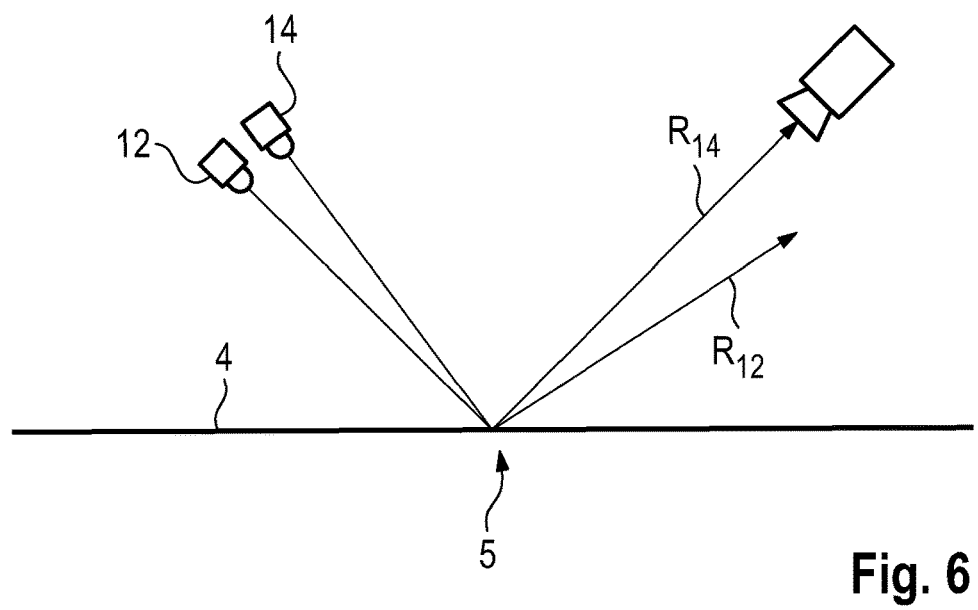
FIG. 6 schematically shows the illumination conditions during an inspection of a surface having a surface defect.
Figure 7:
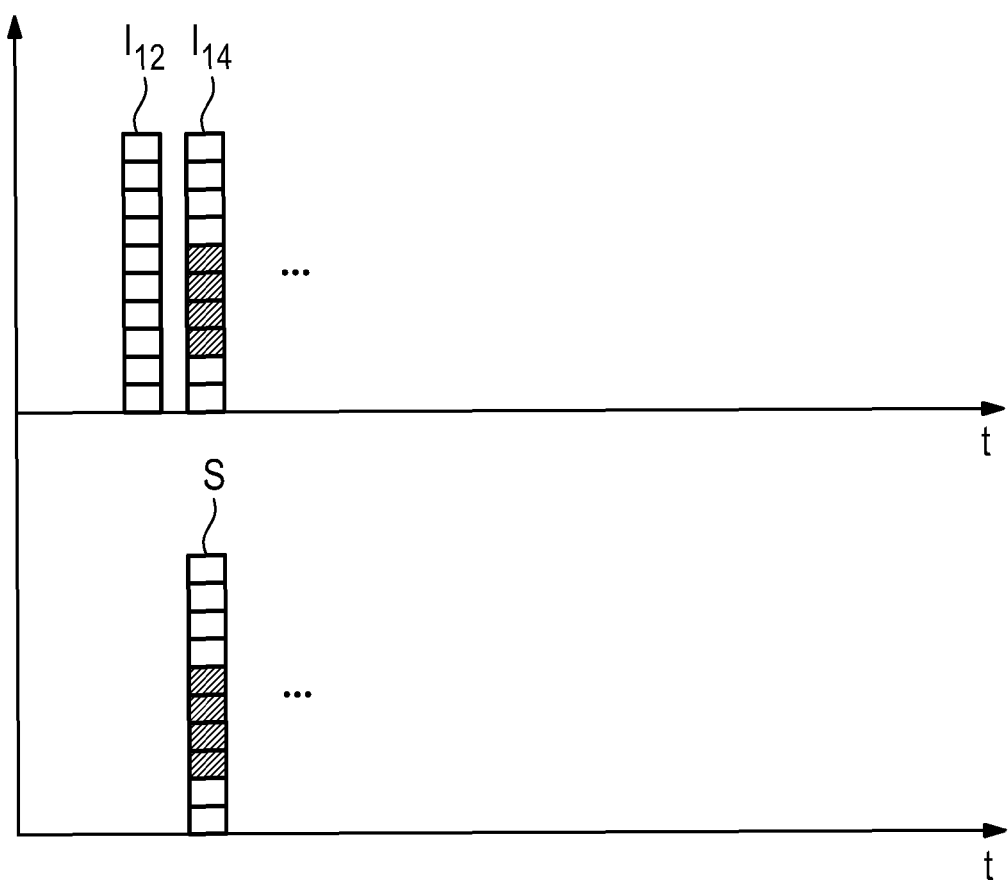
FIG. 7 schematically shows the line images captured by the camera of the surface inspection system under the conditions of FIG. 6, and the result of a comparison of the two line images.

With reference to FIGS. 6 and 7, the detection of a surface defect is now explained.

Generally stated, a surface defect can be considered as an area of the surface where the "mirror" the reflecting surface is incorrectly oriented. The result of the incorrect orientation of the mirror is that camera 16 is no longer able to "see" into the space between the two adjacent light sources 12, 14. Rather, the symmetry of the light reflected towards the camera is disturbed, and there is a good chance that the camera will see directly into one of the light sources, and thus will capture a line image with maximum illumination while not being able to see the other light source, and thus will capture a line image with no illumination.

FIG. 6 shows a surface defect in inspection area 5 which results in the light coming from light source 14 being reflected into the camera 16 bright-field illumination while the light coming from light source 12 is being reflected away from the camera, dark-field illumination.

As can be seen in FIG. 7, the captured line image $I_{12}$ thus has pixels with an intensity of zero while captured line image $I_{14}$ has some pixels with maximum intensity. The surface defect is here assumed to be four pixels wide.

Since the captured line images are not identical, the result of the comparison of the line images shows some pixels at the location of the surface defect, with a value different from zero. It is irrelevant whether the value is positive or negative. This simply depends on the order in which the two line images are subtracted from each other. Pixels in the result S of the subtraction which have a value different from zero are a clear indication that there is a surface defect.

In the simplified example used here for explaining the system and the method, a distinction between "no surface defect" and "surface defect present" will require a definition of a certain threshold for the intensity of the pixels in the result of the comparison since in practice, the two line images will likely not be 100% identical because of tolerances e.g. in the light intensity of the two light sources and because every two subsequently captured line images $I_{12}$ and $I_{14}$ have been taken from slightly different points of the surface of the sheet element because of the sheet element continuously advancing during the surface inspection. Any intensity below an appropriate threshold will be considered as "no surface defect", and any intensity above this threshold will be interpreted as "surface defect present".

In practice, the detection of a surface defect, such as a scratch, is not based on a simple threshold, but is based on the detection of local variations of a difference image which is reconstructed from the individual subtracted images $S_n$. This reconstructed image can be 800 mm×800 mm and is reconstructed while the sheet element 4 is moving along direction A.

The way a reconstructed image is obtained will now be described with reference to FIGS. 8 and 9.

Generally speaking, from the interlaced line images captured under the different illumination conditions, a reconstructed first image a reconstructed image consisting of the line images captured under illumination with first light source 12 and a reconstructed second image reconstructed image consisting of the line images captured under illumination with second light source 14, will be created, and these images will be analyzed by the image evaluation unit.

For all embodiments, the illumination of the sheet element from which line images are being captured is synchronized with the camera and the displacement of the sheet element in sheet speed. As an example, a line image is captured when the viewing area is illuminated. Then a short period later, when the sheet element has been moved by e.g. 0.05 mm, the viewing image is again illuminated, and the next line image is captured, and so on.

FIG. 8 schematically shows the interlaced line images $I_{12}$ shown in normal lines and $I_{14}$, shown in dotted lines captured by the camera. Here, only ten of the line images of each illumination condition are shown. In practice, several thousands of line images $I_{12}$, $I_{14}$ are being captured for each sheet element 4. Assuming that 4,000 line images $I_{12}$ and 4,000 line images $I_{14}$ are being captured for one sheet element 4 and that camera 16 is able to capture 80,000 line images per second, then ten sheet elements at 4 per second can be processed.

FIG. 9 schematically shows how a reconstructed first image 40 is reconstructed from the line images $I_{12}$ and how a reconstructed second image 50 is reconstructed from line images $I_{14}$.

Should camera 16 capture line images under more than the two illumination conditions which are described here illumination with two different light sources 12, 14 and shown in FIG. 8, then the data captured by camera 16 would consist of three or more types of interlaced line images, and three or more reconstructed images would be reconstructed, one for each illumination condition.

Image evaluation unit 18 processes the reconstructed images 40, 50, either entirely or in those portions which are of interest in order to detect an item of interest. Here, the reconstructed images 40, 50 are compared in order to identify scratches on the surface of the sheet elements 4.

Assuming that a subtracted image has a "normal" value of 20 grayscale intensity units, if the grayscale value suddenly changes to 0 or 40 and furthermore the variation of the grayscale intensity has a geometrical shape which corresponds to a scratch then an image evaluation unit 18 identifies this area of the sheet element as including a scratch. There is one surface defect which cannot be detected with the described method and the described system when the sensor line is oriented perpendicularly with respect to the direction A, along which the sheet elements are being advanced: a scratch extending perfectly parallel to the direction A along which the sheet elements 4 are being advanced through the quality inspection station 2. Such surface defect will result in the value of some pixels of the captured line image being different from others of a line of pixels, but there will be no change of intensity between subsequently captured line images $I_{12}$ and $I_{14}$.

In order to be able to detect surface defects regardless of their orientation, an additional surface inspection system of the type described above can be used, with the orientation of the inspection area 5 being different from the orientation of the inspection area of the first surface inspection system.

It is also possible to have the inspection area 5 of a first surface inspection system arranged at an angle of +45° with respect to the travel direction A of the sheet elements and the inspection area 5 of a second surface inspection system arranged at an angle of −45° with respect to direction A.

The surface inspection system 10 can be part of a more complex inspection unit with others illumination units. In particular, light sources 12, 14 can be part of more complex illumination units which are being used for detecting creases and embossed structures on the sheet elements.

The invention claimed is:

1. A surface inspection system for inspecting a surface of a sheet element present in an inspection area, the system comprising:
    two light sources arranged adjacent each other on opposite sides of an illumination plane that extends across the sheet element, and the light sources are inclined with respect to the illumination plane by an angle in a range of 5° to 10° and are oriented for illuminating the inspection area;
    a camera configured for capturing line images of the inspection area along a viewing plane, and the line images extend across the sheet element along an inspection plane at the inspection area;
    an image evaluation unit, the camera communicating with the image evaluation unit for transmission of captured line images to the image evaluation unit;
    the illumination plane and the viewing plane being arranged on opposite sides of a median plane that extends across the sheet element, and the median plane is perpendicular to the inspection plane; and
    an angle between the illumination plane and the median plane being equal to an angle between the viewing plane and the median plane,
    wherein the two light sources are positioned on one side of the median plane.

2. The surface inspection system of claim 1, wherein a viewing area of the camera covers the inspection area.

3. The surface inspection system of claim 1, wherein a plurality of cameras including the camera is arranged adjacent each other, with the combined viewing area of the cameras covering the inspection area.

4. The surface inspection system of claim 1, wherein the angle between the illumination plane and the median plane is in the range of 15° to 30°.

5. The surface inspection system of claim 1, wherein the camera is a line camera.

6. The surface inspection system of claim 1, wherein the camera is a 2D camera.

7. The surface inspection system of claim 1, wherein the camera is a color camera.

8. The surface inspection system of claim 1, wherein the camera is a monochrome camera.

9. The surface inspection system of claim 1, wherein the camera has a resolution, at the surface of the sheet element to be inspected, in the range of 0.05 to 0.6 mm.

10. A method of inspecting the surface of the sheet element by using the surface inspection system of claim 1, the method comprising:
    directing light by a first of the two light sources onto the sheet element to be inspected;
    capturing by the camera a first line image of the inspection area; then
    directing light by a second of the two light sources onto the sheet element to be inspected;
    capturing by the camera a second line image of the inspection area;
    receiving by the image evaluation unit the captured line images from the camera;
    forming by the image evaluation unit a reconstructed image either:
    (a) by subtracting the line images from each other and combining the subtracted line images, or
    (b) by combining the captured line image related to each light source separately, thereby obtaining an intermediate reconstructed image for each light source, and subtracting the intermediate reconstructed images from each other; and
    analyzing the reconstructed image to detect surface defects on the sheet element.

11. The method of claim 10, wherein the camera is configured for capturing more than 10,000 line images.

12. The method of claim 10, wherein the sheet element is being moved with respect to the surface inspection system at a speed in the order 1 to 15 m/s.

13. The method of claim 10, wherein the inspected sheet element at least partially has a reflective surface.

14. The method of claim 10, wherein the image evaluation unit analyzes the reconstructed image so as to identify changes of a grayscale intensity thereof.

15. A method of inspecting the surface of the sheet element by using the surface inspection system of claim 1, the method comprising:
    directing light by a first light source of the two light sources onto the sheet element;
    capturing by the camera a first line image of the inspection area; then
    directing light by a second light source of the two light sources onto the sheet element;
    capturing by the camera a second line image of the inspection area; and
    receiving by the image evaluation unit the captured line images from the camera.

16. The method of claim 15, wherein the method further comprises:
    determining by the image evaluation unit that no surface defect exists when the image evaluation unit detects no substantial difference between the first line image and the second line image.

17. The surface inspection system of claim 1, wherein a first light source of the two light sources is positioned at a first angle to the illumination plane, and a second light source of the two light sources is positioned at a second angle to the illumination plane, the first angle being the same in absolute value as the second angle.

* * * * *